3,833,515
CATALYST FOR THE PREPARATION OF POLYOLEFINS

Rudolf Amtmann, Kriftel, and Bernd Diedrich, Frankfurt am Main, Germany, assignors to Farbwerke Hoechst Aktiengesellschaft, Frankfurt am Main, Germany
No Drawing. Filed Sept. 1, 1971, Ser. No. 177,101
Claims priority, application Germany, Sept. 2, 1970, P 20 43 508.9
Int. Cl. B01j *11/84*
U.S. Cl. 252—429 B         6 Claims

ABSTRACT OF THE DISCLOSURE

A polymerization catalyst is prepared by mixing (a) the reaction product between a magnesium compound containing hydroxyl groups, a titanium alcoholate and a silicium tetrahalide with (b) an organo aluminum compound. By means of this catalyst, olefins can be polymerized under a very low pressure and the polymer obtained does not require the removal of the catalyst.

---

The present invention relates to a catalyst for the preparation of polyolefins.

It has been proposed to polymerize $\alpha$-olefins and mixtures thereof in accordance with the Ziegler low pressure process. In this process, compounds of the elements of subgroups IV to VI of the Periodic Table in admixture with organo-metal compounds of the elements of groups I to III of the Periodic Table are used as catalysts, the polymerization being generally carried out in suspension, in solution, or in the gaseous phase.

Processes have also been proposed, in which the catalyst components are used in combination with an inorganic solid.

According to Belgian Pat. No. 650,679 and French Pat. No. 1,448,320, hydroxychlorides of bivalent metals of the general formula Me(OH)Cl are reacted with compounds of transition metals to give Ziegler catalysts. However, high polymerization yields per gram of catalyst are only obtained, if the polymerization is carried out under a pressure of at least 20 atmoshperes gage.

The pretty complicated way of preparation of the preferably used Mg(OH)Cl by means of a very careful gradual dehydration of $MgCl_2 \cdot 6H_2O$ at 285° C. and, besides, the relatively high content of chlorine of the support material are a drawback, however.

U.S. Pat. No. 3,326,877 describes a catalyst supported on a carrier which is formed by the reaction of finely distributed inorganic metal oxides (particles size $<0.1$ micron), preferably pyrogenic silica or aluminum oxide, with esters of the transition metals. However, the polymerization yields obtained by means of this catalyst are very low; for example, with a pressure of 12 atmospheres and 2 g. of catalyst, on which 2 milligram-atom of Ti have been fixed, only 80 g. of polyethylene are obtained.

U.S. Pat. No. 3,285,891 describes a polymerization catalyst consisting of the reaction product of a finely distributed inorganic metal oxide (particle size $<0.1$ micron) with esters of the transition metals, organometal compounds and a Lewis acid—such as $BF_3$ or $AlCl_3$.

However, the polymerization yields are not always satisfactory, for example, 340 g. of polyethylene are obtained with 2 mg. of Ti, which is fixed on 2 g. of silicic acid.

Belgian Pat. No. 735,291 describes catalysts which are formed by the reaction of magnesium compounds containing hydroxyl groups with titanium compounds containing chlorine and alkoxy groups; in the process of polymerization of $\alpha$-olefins according to the Ziegler process, very high catalyst yields are obtained.

It has now been found that extremely active catalysts can be prepared, if chlorine-free tetravalent titanium alcoholates are reacted with chlorine-free magnesium compounds containing hydroxyl groups, in the presence of silicium tetrachloride.

The present invention provides a process for homo- and copolymerizing olefins of the general formula

$$R-CH=CH_2$$

in which R stands for hydrogen or a hydrocarbon radical having from 1 to 8 carbon atoms, in solution, in suspension, or in the gaseous phase, at a temperature in the range of from about 20 to 200° C., under a pressure of up to about 50 atmospheres gage, in the presence of a mixed catalyst consisting of a catalyst component containing magnesium and titanium (component A) and an organometal compound of groups I to III of the Periodic Table (component B), optionally, with regulation of the molecular weight of the polymer by means of hydrogen, wherein component A is formed by the reaction of halogen-free magnesium compounds containing hydroxyl groups with tetravalent halogen-free titanium alcoholates and silicium tetrahalide.

The preparation of component A may be effected in such a way that the chlorine-free Mg compound containing hydroxyl groups is mixed with the titanium alcoholate in an inert hydrocarbon and that silicium tetrachloride is dropped to this suspension, while stirring. For the reaction, a temperature in the range of from 0° to 200° C., preferably from 50° to 150° C., is preferred, the upper temperature limit being given by the decomposition temperature of the respective titanium compound. In principle, temperatures below 0° C. may also be applied, however, longer reaction times have to be taken into account in that case. Subsequently, the suspension is stirred again for after-reaction at a temperature in the range of from 80 to 150° C.—preferably from 50 to 120° C.

The stirring time depends on the temperature of the experiment and the desired reaction degree and is advantageously between 2 and 20 hours. Generally, the reaction degree increases with a rise in temperature and stirring time.

In order to isolate component A, the compounds soluble in hydrocarbons are separated by several washings with an inert hydrocarbon. As inert hydrocarbons there are suitable aliphatic or cyclo-aliphatic hydrocarbons, such as pentane, hexane, heptane, cyclohexane, methylcyclohexene, as well as aromatic hydrocarbons, such as benzene and xylene; hydrogenated Diesel oil fractions may also be used. By means of the washing with the hydrocarbons, titanium compounds and silicium tetrachloride which are not fixed on the solid are removed.

Another variant of the process for preparing component A consists in mixing the magnesium compound suspended in an inert hydrocarbon at the same time with the Ti-alcoholates and silicium tetrachloride, at a temperature in the range of from 20 to 200° C., preferably from 20 to 120° C.

For after-reaction, the suspension is stirred at a temperature in the range of from 20 to 150° C.

The reaction product which is insoluble in hydrocarbons is then again washed, as has been mentioned above. Moreover, component A may also be prepared in such a way that silicium tetrachloride is added to the magnesium compound in an inert hydrocarbon, and that the titanium compound is dropped into this suspension at a temperature of from 20 to 200° C.—preferably from 50 to 120° C., while stirring.

For the preparation of component A, from 1 to 4 moles of the magnesium compound containing hydroxyl groups are suitably reacted with from 0.1 to 4 moles of titanium alcoholates and from 0.5 to 5 moles of of silicium tetrachloride.

As titanium compounds for the preparation of component A, there are used tetravalent halogen-free titanium alcoholates, such as titanium compounds of the general formula Ti(OR)$_4$, in which R stands for identical or different alkyl radicals having from 1 to 6 carbon atoms and/or condensed titanium alcoholates and/or condensed alcoholates of titanium and aluminum and/or of titanium and silicium (prepared, for example, in accordance with U.S. Pat. No. 3,458,552).

There may be cited, for example, Ti(Oibutyl)$_4$, RO[Ti(OR)$_2$O]$_n$R ($n$=2-10) (R=alkyl radical with 1-6 carbon atoms), Ti(OR)$_3$—O—Si(OR)$_3$ (R=1-6 carbon atoms), Ti(OR)$_3$—O—Al(OR)$_2$ (R=alkyl radical with 1-6 carbon atoms).

The use of Ti(Oipropyl)$_4$ and/or Ti(OiC$_4$H$_5$)$_4$ is particularly preferred. Use may also be made of mixtures of titanium alcoholates, preferably of titanium isopropylate and/or titanium isobutylate with silicic acid esters and/or aluminum alcoholates. As silicic acid esters and/or aluminum alcoholates, there are used preferably Si(Oipropyl)$_4$ and/or Al(Oipropyl)$_4$.

For the preparation of component A there are used halogen-free magnesium compounds containing hydroxyl groups. Besides OH groups, the magnesium compounds may contain, in particular, nitrate, sulfate, carbonate, oxide, phosphate, silicate, or carboxylate groups.

Preference is given to the use of magnesium compounds containing from 0.2 to 2, preferably from 0.5 to 2 moles of OH groups per gram-atom of magnesium, and having an average grain size of from 1 to 100$\mu$.

The magnesium compound is prepared in accordance with known methods. Thus, for example, the magnesium compound containing hydroxyl and carbonate groups may be prepared in such manner that aqueous solutions of magnesium salts, such as MgCl$_2$, MgSO$_4$, (Mg(NO$_3$)$_2$ are mixed with aqueous Na$_2$CO$_3$ or K$_2$CO$_3$ solutions, or with mixtures of Na$_2$CO$_3$ and NaOH solutions.

The precipitates are washed and are subsequently largely dehydrated and afterwards finely ground. The drying is suitably effected at a temperature in the range of from 150 to 250° C., optionally, under reduced pressure.

As magnesium compounds containing hydroxyl and sulfate groups, there may be used, for example, magnesium-oxide-sulfate cements which are formed under the action of an aqueous MgSO$_4$ solution on MgO, and which have been treated at a temperature of from 160 to 250° C. A molar ratio of MgO:MgSO$_4$ in the range of from 3:1 to 5:1 is advantageously used.

In order to prepare the magnesium compound containing OH groups it is also possible to react MgO with water and/or acids of the formula HX, in which X stands for a nitrate, (carbonate)$_{1/2}$, (SiO$_4$)$_{1/4}$ (PO$_4$)$_{1/3}$, (sulfate)$_{1/2}$, or carboxylate radical, preferably acetate. Per gram of MgO, there are suitably reacted from 0.5 to 30 millimoles of water or HX.

In order to prepare component A, use is made of silicium halides, preferably silicium tetrachloride.

The titanium content of component A may be in the range of from 0.01 to 10 milligram-atom per gram of component A. It can be influenced by the reaction time, the reaction temperature, the concentration of the tetravalent halogen-free titanium alcoholates used, and by the molar reaction ratio of titanium alcoholate to silicium tetrachloride.

As component B, there are used organic compounds of the metals of groups I, II, III and IV of the Periodic Table. Organo-aluminum compounds are preferably used as component B.

As organo-aluminum compounds there may be used the reaction products of trialkyl-aluminum compounds or dialkyl-aluminum hydrides having hydrocarbon radicals with from 1 to 6 carbon atoms, preferably Al(iBu)$_3$, or Al(iBu)$_2$H, and diolefins having from 4 to 20 carbon atoms, preferably isoprene. 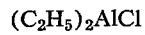

As component B there may also be used chlorine-containing organo-aluminum compounds, such as dialkyl-aluminum chlorides of the formula R$_2$AlCl or alkyl-aluminum sesquichlorides of the formula Al$_2$R$_3$Cl$_3$, in which R stands for identical or different hydrocarbon radicals, preferably alkyl radicals having from 1 to 16, preferably from 2 to 12 carbon atoms. As examples there may be mentioned: (C$_2$H$_5$)$_2$AlCl, (iC$_4$H$_9$)$_2$AlCl, (C$_2$H$_5$)$_2$AlCl Especially good results are obtained, if as component B trialkyl-aluminum compounds of the formula AlR$_3$ or dialkylaluminum hydrides of the formula AlR$_2$H are used, in which R stands for identical or different hydrocarbon radicals, preferably alkyl radicals having from 1 to 16, preferably from 2 to 6 carbon atoms, such as Al(C$_2$H$_5$)$_3$, Al(C$_2$H$_5$)$_2$H, Al(C$_3$H$_7$)$_3$, Al(C$_3$H$_7$)$_2$H, Al(iC$_4$H$_9$)$_3$, Al(iC$_4$H$_9$)$_2$H.

The conversion of the tetravalent titanium compound of component A into the polymerization active, lower valency stage is advantageously effected during polymerization by the organo-metal compound (component B) at a temperature of from 20 to 200° C.

It is likewise possible, however, to treat component A, prior to polymerization, with the organo-metal compound at a temperature of from −30° to 100° C., preferably from 0° to 20° C., and then to use it for polymerization. If chlorine-containing organo-aluminum compounds are used, however, it is preferable to wash the reaction product obtained. In the polymerization process, it is then activated with a further amount of organoaluminum compound, at a temperature of from 20 to 200° C.

The polymerization of olefins with the catalysts of the invention is carried out in solution, in suspension, or in the gaseous phase, either continuously or discontinuously, at a temperature of from about 20° to 200° C., preferably from about 50 to 150° C. The pressure is up to about 50 atmospheres gage, preferably from about 1.5 to 8 atmospheres gage. In principle, however, higher or lower pressures and temperatures than those specified are also possible.

To carry out the polymerization in suspension, the inert solvents commonly used for the Ziegler low pressure process are suitable, such as have been specified in detail in the preparation of component A above.

The organo-metal compound (component B) may be used in a concentration of from 0.5 to 10 millimoles, preferably from 2 to 6 millimoles per liter of dispersion medium or per liter of reactor volume.

Component A of the catalyst is used in a concentration of from 0.01 to 1 millimole, preferably from 0.1 to 1 millimole of Ti per liter of dispersion medium or per liter of reactor volume.

As monomers, olefins of the general formula
R—CH=CH$_2$
can be used, in which R represents hydrogen or a hydrocarbon radical, in particular a straight-chain or branched, substituted or unsubstituted alkyl radical having from 1 to 10, preferably from 1 to 8 carbon atoms. As an example, there may be mentioned ethylene, propylene, butene-1, pentene-1, 4-methylpentene-1, and octene-1.

Mixtures of the olefins of the above-mentioned formula may also be used, in particular those containing up to 10% by weight, preferably 5% by weight, of one or several comonomers.

The polymerization is preferably carried out with ethylene or mixtures of ethylene with up to 10% by weight of $\alpha$-olefins of the specified formula.

The molecular weight of the polymers can be regulated in known manner, preferably by means of hydrogen.

To manufacture polyolefins suitable for being processed by extrusion or injection-moulding, the polymerization is carried out with a hydrogen content in the gaseous phase of up to 80% by volume. For the preparation 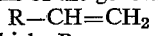

of low molecular weight olefins (waxes), however, the polymerization is carried out with a hydrogen content in the gaseous phase of from 80 to 100% by volume.

Owing to the use of chlorine-free magnesium compounds containing hydroxyl groups and chlorine-free titanium alcoholates, the catalysts of the invention lead to polymers having extremely favourable corrosion values. Besides, the catalysts of the invention lead to very high catalyst yields, in the polymerization of α-olefins, already under a low pressure.

Thus, for example, if the reaction product of magnesium compounds containing hydroxyl groups—such as basic magnesium sulfates or carbonates—with titanium tetra-isopropylate and $SiCl_4$ is used, at a polymerization pressure of below 7 atmospheres gage, up to 15 kg. of polymer are obtained per gram of magnesium compound used for the preparation of the catalyst. Up to 17.5 kg. of polymer are obtained per gram of titanium.

Under higher polymerization pressures the polymerization processes may be carried out with a still lower amount of catalyst, as the the catalyst yields increase very strongly with an increasing polymerization pressure.

Due to the very low halogen content of the catalysts and the high catalyst yields, the catalysts may remain entirely in the polymer.

Thus, by means of the catalysts of the invention, very simple polymerization processes can be performed, already with pressures of from 1 to 7 atmospheres gage, as in the case of polymerization in suspension such expensive operations, as catalyst decomposition or removal of catalyst, etc., are not required. After it has been separated from the dispersion medium by filtration, the polyolefin is dried and is then directly processed. In the case of polymerization in suspension, the dispersion medium filtered off may be used for further polymerization processes without distillation.

In the case of the continuous polymerization in suspension, the dispersion medium is suitably recirculated. The catalysts of the invention are particularly suitable for the polymerization in the gaseous phase, as the polymer obtained may be directly processed, without any removal of catalyst.

It is surprising and could not have been foreseen that the reaction of chlorine-free magnesium compounds containing hydroxyl groups, chlorine-free titanium alcoholates, and silicium tetrachloride yields particularly active catalysts for the Ziegler polymerization.

If magnesium compounds that are free from hydroxyl groups—such as $MgSO_4$—are used, only catalysts having a minor polymerization activity are obtained, under the same conditions for the preparation of the catalysts.

Also in the case of the reaction of magnesium compounds containing hydroxyl groups with chlorine-free titanium alcoholates, in the absence of silicium tetrachloride, only catalysts having a minor polymerization activity are obtained.

If the catalysts are prepared in the presence of other acid chlorides, such as $BCl_3$, $SnCl_4$, $PbCl_4$, $PCl_3$, and others, also a minor polymerization activity is found.

The following Examples serve to illustrate the invention.

EXAMPLES

In the following Examples a hydrogenated Diesel oil fraction was used which had a boiling range of from 140° to 200° C.

The titanium content was determined colorimetrically with hydrogen peroxide (Lit.: G. O. Mueller, Praktikum der quantitativen chemischen Analyse, 4th edition (1957), page 243).

The reduced specific viscosities ($\eta_{spec.}/c$.-values) were measured at 135° C. in a 0.1% solution in decahydronaphthalene.

The polymerization processes were stopped after 6 hours. The polymer was separated from the dispersion medium by filtration over a pressure filter, subsequently it was dried in a fluidized bed drier.

EXAMPLE 1

(a) Preparation of magnesium oxide-sulfate-cement 400 g. of MgO were added, while stirring, to the solution of 240 g. of $MgSO_4$ in 1.5 liter of $H_2O$. The suspension was allowed to set at 100° C. The solid product was ground and was then dried for 24 hours at 110° C. and for 24 hours at 200° C.

(b) Preparation of catalyst 305 milliliters (1.05 mole) of $Ti(Oipropyl)_4$ were added to 1500 milliliters of Diesel oil. Subsequently, 75 g. of the magnesium oxide-sulfate-cement prepared according to Example (1a) were added to the solution. At 50° C., 120 milliliters (1.05 mole) of $SiCl_4$ were dropped into the suspension, which was then stirred for 4 hours at 80° C. The precipitate was washed with Diesel oil by decanting and stirring, until 10 milliliters of the supernatant solvent contained less than 0.001 millimole of titanium compound. The volume was made up to 400 milliliters with Diesel oil. 10 milliliters of suspension contained 0.3 millimole of titanium compound.

(c) Polymerization of ethylene 100 liters of Diesel oil were introduced into a vessel having a capacity of 200 liters, the oil was heated at 85° C., and the air was replaced by scavenging with nitrogen. Subsequently, 45.6 g. (0.4 mole) of triethyl-aluminum and 330 milliliters ($\triangleq 10$ millimoles of titanium compound) of the catalyst suspension prepared according to Example 1(b) were added. 6 kg. of ethylene were introduced per hour, together with hydrogen in such an amount that the proportion thereof in the gaseous phase amounted to 15% by volume. In the course of polymerization, the pressure rose to 2.4 atmospheres gage. The reaction product was separated from the dispersion medium by means of a pressure filter. 34 kg. of polyethylene were obtained having a reduced specific viscosity of 2.7 dl/g.

5.5 kg. of polyethylene were obtained per gram of basic magnesium sulfate used in the preparation of the catalyst, and 3.4 kg of polyethylene were obtained per millimole of titanium compound.

Comparative Example 1

The Comparative Example was carried out to show that catalysts were obtained which yielded very small amounts of polyethylene in the process of polymerization, if magnesium sulfate not containing any hydroxyl groups was used for the preparation of the catalyst, under the conditions specified in Example 1b.

(a) Preparation of catalyst

In accordance with Example 1(b), a catalyst suspension was prepared, while using 18.1 g. (0.15 mole) of pure $MgSO_4$, 300 milliliters of Diesel oil, 17.2 milliliters of $SiCl_4$, and 44 milliliters of $Ti(Oipropyl)_4$. 10 milliliters of suspension contained only traces of titanium compound.

(b) Polymerization of ethylene 500 milliliters of Diesel oil were introduced into a laboratory autoclave having a capacity of 1 liter, and the oil was heated at 85° C. The air was replaced by nitrogen, subsequently, 100 milliliters of the catalyst suspension prepared according to Comparative Example 1(a) and 10 millimoles of $Al(C_2H_5)_3$ were added. The polymerization was carried out at 85° C. by introducing about 40 g. of ethylene per hour. The proportion of hydrogen in the gaseous phase was 30% by volume. After about 6 hours, the polymerization was stopped, with a pressure increase of 6 atmospheres gage in the autoclave. 12 g. of polyethylene were obtained.

Comparative Example 2

Another Comparative Example was carried out to show that extremely inactive polymerization catalysts were obtained, if magnesium sulfate containing hydroxyl groups was used and the catalyst was prepared under the conditions specified in Example 1(b), however, in the absence of silicium tetrachloride.

(a) A catalyst suspension was prepared, while using 15 g. of the Mg-oxide-cement prepared according to Example 1(a), 300 milliliters of Diesel oil and 61 milliliters of Ti(Oipropyl)$_4$, however, without adding SiCl$_4$. 10 milliliters of suspension contained only minor traces of titanium compound.

(b) A polymerization was carried out under the conditions specified in Comparative Example 1(b), while using 100 milliliters of the catalyst suspension obtained according to Comparative Example 2(a). After 6 hours, 8 g. of polyethylene had been formed.

Example 2

(a) Preparation of catalyst 74.5 milliliters (0.21 mole) of Ti(Oibutyl)$_4$ were added to 300 milliliters of Diesel oil. 15 g. of the Mg oxide-sulfate-cement prepared according to Example 1(a) were added to the solution. At 50° C., 24 milliliters (0.21 mole) of SiCl$_4$ were dropped into the suspension which was subsequently stirred for 4 hours at 80° C. The precipitate was washed with Diesel oil by decanting and stirring, until 10 milliliters of the supernatant solution contained less than 0.001 millimole of titanium compound. The volume was made up to 400 milliliters with Diesel oil. 10 milliliters of suspension contained 0.09 millimole of titanium compound.

(b) Polymerization 500 milliliters of Diesel oil were introduced into a laboratory autoclave having a capacity of 1 liter, and the oil was heated at 85° C. The air was replaced by nitrogen, subsequently, 5 milliliters of the catalyst suspension prepared according to Example 2(a) and 10 millimoles of Al(C$_2$H$_5$)$_3$ were added. The polymerization was carried out at 85° C. by introducing about 40 g. of ethylene per hour. The hydrogen proportion in the gaseous phase was 30% by volume. After 6 hours, the polymerization was stopped with an increase of pressure to 6 atmospheres gage in the autoclave. 220 g. of polyethylene were obtained having a reduced specific viscosity of 1.7 dl./g.

2.2 kg. of polyethylene were obtained per gram of basic magnesium sulfate used in the preparation of the catalyst, and 4.4 kg. of polyethylene were obtained per millimole of titanium compound.

Example 3

(a) Preparation of a magnesium compound containing hydroxyl and carbonate groups 49 g. of MgSO$_4$ and 38 g. of Na$_2$CO$_3$ were dissolved in 500 milliliters each of H$_2$O at 80° C., and the two solutions were united. The solution obtained was stirred for 15 minutes at 95° C., the precipitate was filtered off, and washed with hot water until the filtrate was free from sulfate. The filter cake was dried for 24 hours at 150° C.

(b) Preparation of catalyst 47 milliliters (0.16 mole) of Ti(Oipropyl)$_4$ were introduced into 300 milliliters of Diesel oil, and 15 g. of the basic Mg carbonate prepared according to Example 3(a) were added. At 50° C., 12.3 milliliters (0.16 mole) of SiCl$_4$ were dropped into the suspension, and the temperature was then kept at 80° C. for 4 hours. The precipitate was washed with Diesel oil by decanting and stirring, until 10 milliliters of the supernatant solution contained less than 0.001 millimoles of titanium compound. The volume of the suspension was made up to 400 milliliters with Diesel oil. 10 milliliters of suspension contained 1.5 millimole of titanium compound.

(c) Polymerization of ethylene

A polymerization was carried out under the conditions specified in Example 1(c), while using 65 milliliters of the catalyst suspension obtained according to Example 3(b). After 6 hours, 34 kg. of polyethylene had formed having a reduced specific viscosity of 2.3 dl./g. 7.2 kg. of polyethylene were obtained per gram of basic Mg carbonate used for the preparation of the catalyst, and 3.4 kg. of polyethylene were obtained per millimole of titanium compound.

(d) Polymerization of ethylene

A polymerization was carried out according to Example 2(b), while using 0.8 milliliter of the catalyst suspension obtained according to Example 3(b). 11.9 milliliters of Alisoprenyl were used, instead of Al(C$_2$H$_5$)$_3$. 118 g. of polyethylene were obtained having a reduced specific viscosity of 1.38 dl./g.

4 kg. of polyethylene were obtained per gram of basic magnesium carbonate used for the preparation of the catalyst, and 0.98 kg. of polyethylene were otbained per millimole of titanium compound.

Comparative Example 3

In the Comparative Example, magnesium carbonate which was free from hydroxyl groups was reacted for the preparation of the catalyst, under the conditions specified in Example 3(b), whereby a polymerization catalyst of a minor activity was obtained.

(a) Preparation of catalyst

In accordance with Example 3(b), a catalyst suspension was prepared, while using 7.7 g. of pure MgCO$_3$, 300 milliliters of Diesel oil, 10.5 milliliters of SiCl$_4$ and 27 milliliters of Ti(Oipropyl)$_4$. 10 milliliters of suspension contained only traces of titanium compound.

(b) Polymerization of ethylene

A polymerization was carried out under the conditions specified in Example 2(b), while using 100 milliliters of the catalyst suspension prepared according to Comparative Example 3(a). After 6 hours, 22 g. of polyethylene had been formed.

Comparative Example 4

In another Comparative Example, basic magnesium carbonate was reacted under the conditions specified in Example 3(b), however, in the absence of silicium tetrachloride.

(a) Preparation of catalyst

In accordance with Example 3(b), a catalyst suspension was prepared, while using 7.5 g. of basic magnesium carbonate, 23.5 milliliters of Ti(Oipropyl)$_4$ and 150 milliliters of Diesel oil. 10 milliliters of suspension contained only traces of titanium compound.

(b) Polymerization

A polymerization was carried out under the conditions specified in Example 2(b), while using 100 milliliters of the catalyst suspension prepared according to Comparative Example 3(a). After 6 hours, 14 g. of polyethylene had been formed.

EXAMPLE 4

(a) Preparation of catalyst

By adding dropwise, within 30 minutes, 4.7 g. of 80% H$_3$PO$_4$ at 30° C. to a well stirred suspension of 6 g. of MgO in 100 milliliters of Diesel oil, a suspension was obtained, to which 45 milliliters of Ti(Oipropyl)$_4$ (0.15 mole) in 200 milliliters of Diesel oil were added. At 50° C., 17.2 milliliters of SiCl$_4$ (0.15 mole) were dropped into the reaction mixture, which was subsequently heated for 4 hours at 80° C. The precipitate was washed with Diesel oil by decanting and stirring, until 10 milliliters of the supernatant solution contained less than 0.001 millimole of titanium compound. The volume of the suspension was made up to 400 milliliters with Diesel oil. 10 milliliters of suspension contained 0.09 millimole of titanium compound.

(b) Polymerization of ethylene

A polymerization was carried out under the conditions specified in Example 2(b), while using 5 milliliters of the catalyst suspension prepared according to Example 4(a). 148 g. of polyethylene were obtained having a reduced specific viscosity of 2.3 dl./g.

1.1 kg. of polyethylene was obtained per gram of basic magnesium phosphate used for the preparation of the catalyst, and 3.5 kg. of polyethylene were obtained per millimole of titanium compound.

EXAMPLE 5

(a) Preparation of catalyst 45 milliliters (0.1 mole) of Ti(Oipropyl)$_4$ were dissolved in 200 milliliters of Diesel oil, and 17.2 milliliters of SiCl$_4$ were added. The solution was stirred for 3 hours at 80° C. and was then added to a suspension which had been obtained by adding dropwise 1.5 g. of glacial acetic acid and 1.4 g. of water at 30° C. within 30 minutes to a suspension of 6 g. of MgO in 100 milliliters of Diesel oil.

Subsequently, the reaction mixture was stirred for 4 hours at 80° C., decanted and the precipitate was washed with Diesel oil, until 10 milliliters of the supernatant solution contained less than 0.001 millimole of titanium compound. The volume of the suspension was made up to 500 milliliters with Diesel oil. 10 milliliters of suspension contained 0.25 millimole of titanium compound.

(b) Polymerization of ethylene

A polymerization was carried out under the conditions specified in Example 2(b), while using 2 milliliters of the catalyst suspension prepared according to Example 5(a), in which process 120 g. of polyethyelne were obtained having a reduced specific viscosity of 2.1 dl./g.

3.2 kg. of polyethylene were obtained per gram of basic magnesium acetate used, and 2.4 kg. of polyethylene were obtained per millimole of titanium compound.

EXAMPLE 6

(a) Preparation of catalyst 51 milliliters (0.17 mole) of Ti(Oipropyl)$_4$ were added to 300 milliliters of Diesel oil, and 10 g. (0.17 mole) of Mg(OH)$_2$ were introduced into the solution. At 50° C., 19.7 milliliters (0.17 mole) of SiCl$_4$ were dropped within 2 hours into the reaction mixture, while stirring. Subsequently, the suspension was stirred for 4 hours at 80° C. The precipitate was washed with Diesel oil by decanting and stirring, until 10 milliliters of the supernatant solution contained less than 0.001 millimole of titanium compound. The volume of the suspension was made up to 400 milliliters with Diesel oil. 10 milliliters of suspension contained 0.25 millimole of titanium compound.

(b) A polymerization was carried out under the conditions specified in Example 2(b), while using 2 milliliters of the catalyst suspension prepared according to Example 6(a). 170 g. of polyethylene were obtained having a reduced specific viscosity of 1.9 dl./g.

3.4 kg. of polyethylene were obtained per gram of magnesium hydroxide used for the preparation of the catalyst, and 3.4 kg. of polyethylene were obtained per millimole of titanium compound.

Comparative Experiment 5

(a) Preparation of catalyst

For reasons of comparison, a catalyst was prepared without using SiCl$_4$.

10 g. of Mg(OH)$_2$ were suspended in 300 milliliters of Diesel oil, and 51 milliliters of Ti(Oipropyl)$_4$ were added. The suspension was stirred for 6 hours at 80° C. The solid was washed with Diesel oil by decanting and stirring, until 10 milliliters of the supernatant solution contained less than 0.001 millimole of titanium compound. The volume of the suspension was made up to 500 milliliters with Diesel oil. 10 milliliters of suspension contained 0.01 millimole of Ti.

(b) Polymerization of ethylene

A polymerization was carried out under the conditions specified in Example 2(b), while using 50 milliliters of the catalyst suspension prepared according to Comparative Experiment 5(a), in which process 5 g. of polyethylene were obtained.

Comparative Experiment 6

For reasons of comparison, catalysts having minor polymerization activity were prepared, while using BCl$_3$, PCl$_3$ and SnCl$_4$.

(a) Preparation of catalyst 55 milliliters (0.185 mole) of Ti(Oipropyl)$_4$ were added to 300 milliliters of Diesel oil, and 10.8 g. (0.185 mole) of Mg(OH$_2$) were suspended in the solution. From a cooled dropping funnel 15 milliliters (0.185 mole) of BCl$_3$ were dropped into the suspension heated at 50° C., while stirring. Subsequently, the suspension was stirred for 4 hours at 80° C. The precipitate was washed with Diesel oil by decanting and stirring, until 10 milliliters of the supernatant solution contained less than 0.001 millimole of titanium compound. The volume of the suspension was made up to 400 milliliters with Diesel oil. 10 milliliters of suspension contained 1 millimole of titanium compound.

(b) Polymerization of ethylene

A polymerization was carried out under the conditions specified in Example 2(b), while using 1 milliliter of the catalyst suspension prepared according to Comparative Experiment 6(a). 18 g. of polyethylene were obtained having a reduced specific viscosity of 3.2 dl./g.

0.72 kg. of polyethylene were obtained per gram of magnesium hydroxide used for the preparation of the catalyst, and 0.18 kg. of polyethylene were obtained per millimole of titanium compound.

(c) In accordance with Comparative Experiment 6(a), the catalyst was prepared, while using 16.2 milliliters of PCl$_3$, instead of BCl$_3$. 10 milliliters of suspension contained 1.25 millimoles of titanium compound.

(d) Polymerization of ethylene

A polymerization was carried out according to Example 2(b), while using 8 milliliters of the catalyst suspension prepared according to Comparative Experiment 6(c). 30 g. of polyethylene were obtained having a reduced specific viscosity of 2.9 dl./g.

14 g. of polyethylene were obtained per gram of magnesium compound used for the preparation of the catalyst, and 30 g. of polyethylene were obtained per millimole of titanium compound.

(e) In accordance with Comparative Experiment 6(a), the catalyst was prepared, while using 21.6 milliliters of SnCl$_4$, instead of BCl$_3$. 10 milliliters of suspension contained 1.75 millimoles of titanium compound.

(f) Polymerization of ethylene

A polymerization was carried out according to Example 2(b), while using 2 milliliters of the suspension prepared according to Comparative Example 6(e). 24 g. of polyethylene were obtained having a reduced specific viscosity of 3.1 dl./g. 24 g. of polyethylene were obtained per gram of magnesium compound used for the preparation of the catalyst, and 75 g. of polyethylene were obtained per millimole of titanium compound.

EXAMPLE 7

(a) Preparation of the mixed condensed titanium-silicium-alcoholate 41 milliliters (143 millimoles) of Si(Oipropyl)$_4$ were dissolved in 200 milliliters of isopropanol, and 41.8 milliliters (143 millimoles) of Ti(Oipropyl)$_4$ were added. A mixture consisting of 50 milliliters of isopropanol and 2.5 milliliters of H$_2$O was slowly dropped into the solution. Subsequently, the solution was refluxed for 30 minutes, and the excess isopropanol was distilled off in vacuo.

(b) Preparation of catalyst 26.1 milliliters of of the titanium-silicium-alcoholate prepared according to Example 7(a) were introduced into 200 milliliters of Diesel oil, then 6.45 g. of the magnesium oxide-sulfate-cement prepared according to Example 1(a) were added. At 50° C., 10.3 milliliters of SiCl$_4$ were dropped into the suspension, subsequently the temperature was raised to 80° C., and the reaction mixture was stirred for 4 hours. The precipitate was purified with Varsol (straight petroleum aliphatic solvents) by decanting and mixing, until 10 milliliters of the supernatant solution contained less than 0.001 millimole of titanium compound. The volume of the suspension was made up to 400 milliliters with Diesel oil. 10 milliliters of suspension contained 0.125 millimole of titanium compound.

(c) Polymerzation of ethylene

A polymerization was carried out according to Example 2(b), while using 4 milliliters of the catalyst suspension prepared according to Example 7(a). 141 g. of polyethylene were obtained having a reduced specific viscosity of 1.85 dl./g.

2.35 kg. of polyethylene were obtained per gram of magnesium oxide-sulfate-cement used for the preparation of the catalyst, and 2.8 kg. of polyethylene were obtained per millimole of titanium compound.

EXAMPLE 8

Polymerization of propylene 500 milliliters of Diesel oil were introduced into a laboratory autoclave having a capacity of 1 liter, and were heated at 55° C. The air was replaced by scavenging with nitrogen, subsequently 8 milliliters (0.1 millimole of titanium compound) of catalyst suspension prepared according to Example 7(a) and 10 millimoles of Al(C$_2$H$_5$)$_3$ were added. The polymerization was carried out at 55° C. by introducing 25 g. of propylene per hour. After about 6 hours, the polymerization was stopped, when the pressure in the autoclave had risen by 6 atmospheres gage. The dispersion medium was removed by steam distillation, and the polypropylene was dried. 65 g. of polypropylene were obtained.

EXAMPLE 9

(a) Preliminary treatment of the catalyst suspension with Al(C$_2$H$_5$)$_3$

At 20° C., a solution of 30 millimoles of Al(C$_2$H$_5$)$_3$ in 20 milliliters of Diesel oil was added, during one hour, to 100 milliliters ($\triangleq$3 millimoles of titanium compound) of the catalyst suspension prepared according to Example 1(b). Subsequently, the reaction mixture was stirred for 2 hours at 20° C.

(b) Polymerization of ethylene in the gaseous phase 2 kg. of polyethylene (reduced specific viscosity=1.8, apparent density 440 grams per liter) were introduced into a horizontal reactor having a capacity of 40 liters and being provided with a stirred scraping along the inner wall.

The reactor was freed from air by evacuating several times and by scavenging for several hours with an ethylene-hydrogen mixture, and was heated at 90° C. 17.1 g. (150 millimoles) of Al(C$_2$H$_5$)$_3$ and 120 milliliters of catalyst suspension prepared according to Example 9(a) were introduced into the reactor. 2 kg. of ethylene were introduced per hour, together with hydrogen in such an amount that the proportion thereof amounted to 20% by volume. The polymerization temperature was 105° C. In the course of the reaction, the pressure rose to 8 atmospheres gage. After 6 hours the polymerization was stopped.

About 14 kg. of polyethylene were obtained having a reduced specific viscosity of 2.2 dl./g.

EXAMPLE 10

Copolymerization of ethylene-propylene 500 milliliters of Diesel oil were introduced into a 1 liter glass autoclave. After the autoclave had been heated at 80° C. and the air had been replaced by ethylene, 5 millimoles of Al(C$_2$H$_5$)$_3$ and 3.5 milliliters ($\triangleq$0.1 millimole of titanium compound) of the catalyst suspension prepared according to Example 1(b) were added.

The polymerization was effected at 90° C. by introducing 40 g. of ethylene per hour, 1.5 g. of propylene per hour, and hydrogen in such an amount that the proportion thereof in the gaseous phase was 10% by volume.

After 6 hours, the polymerization was stopped at a pressure of 7 atmospheres.

After filtration, 180 g. of an ethylene-propylene copolymer having a reduced specific viscosity of 3.1 dl./g. and a density of 0.930 g. cm.$^{-3}$ were obtained.

EXAMPLE 11

(a) Preparation of catalyst 48.5 milliliters (170 millimoles) of silicium isopropylate and 49.2 milliliters (170 millimoles) of titanium isopropylate were introduced into 300 millliters of Diesel oil. and 12 g. of the magnesium oxide-sulfate-cement prepared according to Example 1(a) were added. At 50° C., 19.25 milliliters of SiCl$_4$ were dropped into the suspension. Subsequently, the temperature was raised to 80° C., and the suspension was stirred for 4 hours. The precipitate was purified with Diesel oil by decanting and stirring, until 10 milliliters of the supernatant solution contained less than 0.001 millimole of titanium compound. The volume of the suspension was made up to 400 milliliters. 10 milliliters of suspension contained 0.125 millimole of titanium compound.

(b) Polymerization of ethylene

A polymerization was carried out according to Example 2(b), while using 4 milliliters of the catalyst suspension prepared according to Example 11(a). 150 g. of polyethylene having a reduced specific viscosity of 1.95 were obtained.

1.25 kg. of polyethylene were obtained per gram of magnesium oxide-sulfate-cement used for the preparation of the catalyst, and 3 kg. of polyethylene were obtained per millimole of titanium compound.

EXAMPLE 12

(a) Preparation of catalyst 49.2 milliliters of titanium isopropylate, 17.4 g. of aluminum isopropylate, and 12 g. of the magnesium oxide-sulfate-cement prepared according to Example 1(a) were introduced into 300 milliliters of Diesel oil. At 50° C., 19.25 milliliters of SiCl$_4$ were dropped into the solution, subsequently the temperature was raised to 80° C. The precipitate was purified with Diesel oil by decanting and washing, until 10 milliliters of the supernatant solution contained less than 0.001 millimole of titanium compound. The volume of the suspension was made up to 400 milliliters with Diesel oil. 10 milliliters of suspension contained 0.13 millimole of titanium compound.

(b) Polymerization of ethylene

A polymerization was carried out according to Example 2(b), while using 4 milliliters of the catalyst suspension prepared according to Example 12(a). 145 g. of polyethylene were obtained having a reduced specific viscosity of 1.8 dl./g.

1.22 kg. of polyethylene were obtained per gram of magnesium oxide-sulfate-cement used for the preparation of the catalyst, and 2.78 kg. of polyethylene were obtained per millimole of titanium compound.

What is claimed is:

1. A process for the preparation of a polymerization catalyst consisting of a compound containing magnesium and titanium (component A) and an organo aluminum compound (component B), wherein from 0.01 to 1 molar parts of titanium, being included in component A—component A being formed by the reaction of from 1 to 4 molar parts of a chlorine-free magnesium compound of the formula $Y_{2-n}Mg(OH)_n$, wherein $n$ is 0.1 to 2 and Y is at least one member selected from the group consisting of nitrate-, sulfate-, carbonate-, oxide-, phosphate-, silicate- and acetate radicals with from 0.1 to 4 molar parts of a titanium alcoholate of the formula $Ti(OR)_4$, $$RO[Ti(OR)_2O]_nR$$

wherein $n$ is from 2 to 10, $Ti(OR)_3$—O—$Si(OR)_3$ or $Ti(OR)_3$—O—$Al(OR)_2$, wherein R stands for identical or different alkyl radicals with 1 to 6 carbon atoms, and from 0.5 to 5 molar parts of a silicium tetrahalide at a temperature of from 0 to 200° C., stirring the mixture for after-reaction for a time of from 2 to 20 hours and washing the insoluble reaction product with an inert hydrocarbon—are mixed with 0.5 to 10 molar parts of at least one member selected from the group consisting of trialkyl aluminum compounds of the formula $AlR'_3$ and alkyl aluminum hydrides of the formula $AlR'_2H$, wherein R' stands for identical or different hydrocarbon radicals having from 1 to 6 carbon atoms.

2. The process as claimed in claim 1, wherein a titanium alcoholate of the formula $Ti(OR)_4$ wherein R stands for identical or different alkyl radicals with 1 to 6 carbon atoms, is used.

3. The process as claimed in claim 1, wherein as a chlorine-free magnesium compound of the formula $$Y_{2-n}Mg(OH)_n$$

wherein $n$ is 0.1 to 2 and Y is at least one member selected from the group consisting of nitrate-, sulfate-, carbonate-, oxide-, phosphate-, silicate-and acetate radicals, the reaction product of magnesium oxide with at least one member selected from the group consisting of water and acids of the formula HX, X being $NO_3$, $(SiO_4)_{1/4}$, $(CO_3)_{1/2}$, $(SO_4)_{1/2}$, $(PO_4)_{1/3}$ or

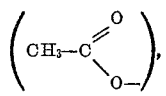

is used.

4. The process as claimed in claim 1, wherein as a titanium alcoholate of the formula $Ti(OR)_4$, $$Ti(O—iC_3H_7)_4$$

is used.

5. A polymerization catalyst consisting of a compound containing magnesium and titanium (component A) and an organo aluminum compound (component B) prepared by mixing from 0.1 to 1 molar parts of titanium, being included in component A—component A being formed by the reaction of from 1 to 4 molar parts of a chlorine-free magnesium compound of the formula $Y_{2-n}Mg(OH)_n$, wherein $n$ is 0.1 to 2 and Y is at least one member selected from the group consisting of nitrate-, sulfate-, carbonate-, oxide-, phosphate-, silicate- and acetate radicals with from 0.1 to 4 molar parts of a titanium alcoholate of the formula $Ti(OR)_4$, $RO[Ti(OR)_2O]_nR$, wherein $n$ is from 2 to 10, $Ti(OR)_3$—O—$Si(OR_3)$ or $$Ti(OR)_3—O—Al(OR)_2$$

wherein R stands for identical or different alkyl radicals with 1 to 6 carbon atoms, and from 0.5 to 5 molar parts of a silicium tetrahalide at a temperature of from 0 to 200° C., stirring the mixture for after-reaction for a time of from 2 to 20 hours and washing the insoluble reaction product with an inert hydrocarbon—with 0.5 to 10 molar parts of at least one member selected from the group consisting of trialkyl aluminum compounds of the formula $AlR'_3$ and alkyl aluminum hydrides of the formula $AlR'_2H$, wherein R' stand for identical or different hydrocarbon radicals having from 1 to 6 carbon atoms.

6. The polymerization catalyst as claimed in claim 5, wherein a titanium alcoholate of the formula $Ti(OR)_4$, wherein R stands for identical or different alkyl radicals with 1 to 6 carbon atoms, is used.

References Cited

UNITED STATES PATENTS

| | | |
|---|---|---|
| 3,326,877 | 6/1967 | Orzechowski et al. 252—431 R X |
| 3,359,214 | 12/1967 | Aftandilian 252—431 R |
| 3,400,110 | 9/1968 | Dassesse et al. 252—429 C X |
| 3,454,547 | 7/1969 | Delbouille et al. 252—429 C X |
| 3,526,616 | 9/1970 | Delbouille et al. 252—429 C X |

PATRICK P. GARVIN, Primary Examiner

U.S. Cl. X.R.

252—428, 429 C, 431 C, 431 R; 260—88.2 R, 93.7, 94.9 C